United States Patent [19]

Mastromattei

[11] Patent Number: 4,713,570

[45] Date of Patent: Dec. 15, 1987

[54] MAGNETICALLY ENHANCED VARIABLE RELUCTANCE MOTOR SYSTEMS

[75] Inventor: Robert Mastromattei, Newton, Mass.

[73] Assignee: Pacific Scientific Co., Rockford, Ill.

[21] Appl. No.: 870,625

[22] Filed: Jun. 4, 1986

[51] Int. Cl.$^4$ .......................... H02K 21/38; H02K 1/24
[52] U.S. Cl. ...................................... 310/154; 310/168
[58] Field of Search ...................... 310/49 R, 154, 165, 310/162, 181, 254, 168, 269

[56] References Cited

U.S. PATENT DOCUMENTS

| | | |
|---|---|---|
| 2,993,134 | 7/1961 | Harvey . |
| 3,215,875 | 11/1965 | Latta ................................ 310/154 |
| 3,310,697 | 3/1967 | Lace . |
| 3,334,254 | 8/1967 | Kober . |
| 3,439,200 | 4/1969 | Saito ................................ 310/49 R |
| 3,495,107 | 2/1970 | Haydon . |
| 3,500,081 | 3/1970 | Drejza . |
| 3,553,508 | 1/1971 | Stcherbatcheff . |
| 3,566,251 | 2/1971 | Hoglund . |
| 3,567,974 | 3/1971 | Spingler . |
| 3,671,841 | 6/1972 | Hoffmann . |
| 3,750,151 | 7/1973 | Dill . |
| 3,836,802 | 9/1974 | Parker . |
| 3,883,633 | 5/1975 | Kohler . |
| 3,906,268 | 9/1975 | Graffenried . |
| 3,979,616 | 9/1976 | Stechmann . |
| 3,984,711 | 10/1976 | Kordik . |
| 3,999,107 | 12/1976 | Reuting . |
| 4,011,479 | 3/1977 | Volkrodt . |
| 4,048,531 | 9/1987 | Buess . |
| 4,075,518 | 2/1978 | Koehler . |
| 4,103,191 | 7/1978 | Kawamura . |
| 4,112,319 | 5/1978 | Field . |
| 4,127,802 | 11/1978 | Johnson . |
| 4,190,779 | 2/1980 | Schaeffer . |
| 4,201,929 | 5/1980 | Sudler . |
| 4,207,483 | 6/1980 | Baer . |
| 4,217,513 | 8/1980 | Kokzai . |
| 4,286,180 | 8/1981 | Langley . |
| 4,306,164 | 12/1981 | Itoh et al. . |
| 4,315,171 | 2/1982 | Schaeffer . |
| 4,339,679 | 7/1982 | Urschel . |
| 4,370,577 | 1/1983 | Wakabayashi et al. . |
| 4,371,799 | 2/1983 | De Wolf . |
| 4,424,463 | 1/1984 | Musil . |

FOREIGN PATENT DOCUMENTS

| | | |
|---|---|---|
| 0158935 | 10/1985 | European Pat. Off. ............ 310/154 |
| 2813701 | 10/1978 | Fed. Rep. of Germany . |
| 2912688 | 3/1979 | Fed. Rep. of Germany . |
| 3335626 | 4/1985 | Fed. Rep. of Germany . |
| 2131979 | 11/1972 | France . |
| 2259472 | 8/1975 | France . |
| 45-16292 | 10/1970 | Japan . |
| 59-86466 | 5/1984 | Japan . |
| 59-153457 | 9/1984 | Japan . |

OTHER PUBLICATIONS

IBM Technical Disclosure Bulletin vol. 6, No. 9, Feb. 1964, Thompson, L. J.

Machine Design vol. 57, No. 9, 25 Apr., 1985, pp. 28–29, R. W. Horber.

Primary Examiner—Patrick R. Salce
Assistant Examiner—D. L. Rebsch
Attorney, Agent, or Firm—Leo Stanger

[57] ABSTRACT

Electrically-energized salient stator poles of a variable reluctance motor terminate in stator teeth that oppose the rotor on a rotor surface. Permanent magnets located between adjacent stator teeth, and magnetized transverse to the stator to rotor gap, enhance the motor torque relative to the applied excitation in ampere-turns. Permanent magnets on the rotor are avoided by reversing the magnetization of the permanent magnets from pole to pole and energizing the pole windings to oppose the magnets in four phases 1 1 0 0, 0 1 1 0, 0 0 1 1, 1 0 0 1 during successive steps. In one embodiment, a linear motor utilizes the system by replacing the rotor with a linear actuator.

32 Claims, 11 Drawing Figures

FIG. 5
| WINDINGS | 82 & 90 | 84 & 92 | 86 & 94 | 88 & 96 |
| POLES | 40 & 48 | 42 & 50 | 44 & 52 | 46 & 54 |
| PHASE | A | B | C | D |
| STEPS | | | | |
| 1 | 1 | 1 | 0 | 0 |
| 2 | 0 | 1 | 1 | 0 |
| 3 | 0 | 0 | 1 | 1 |
| 4 | 1 | 0 | 0 | 1 |
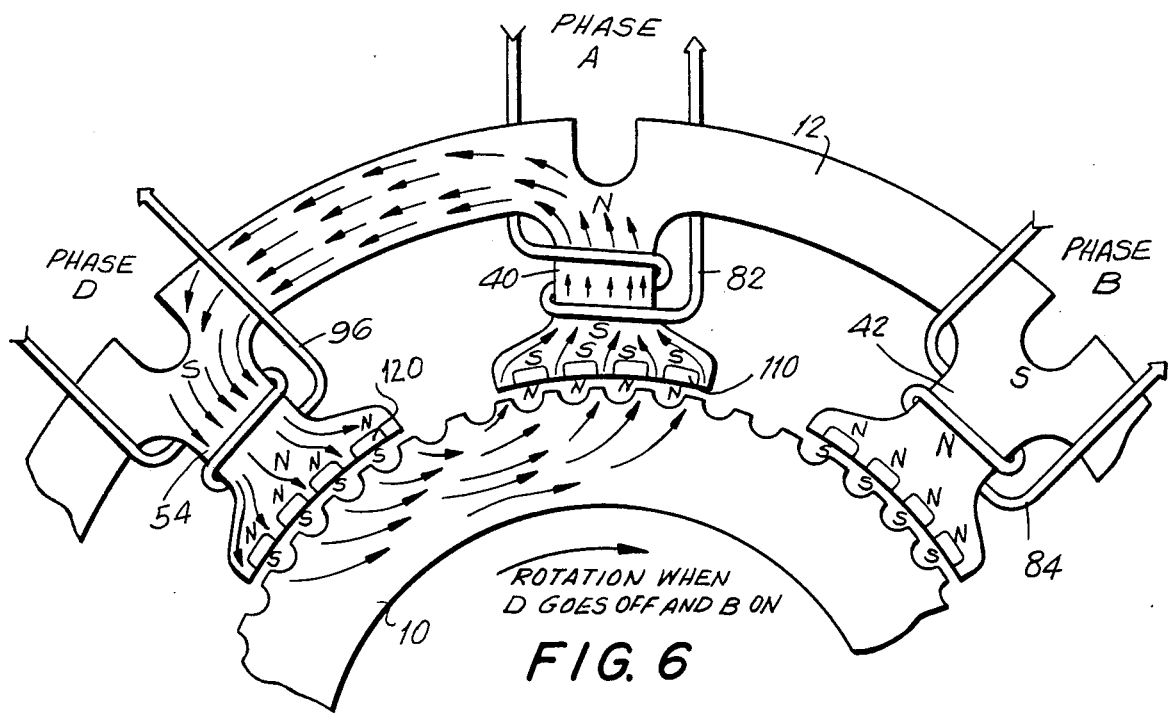
FIG. 6
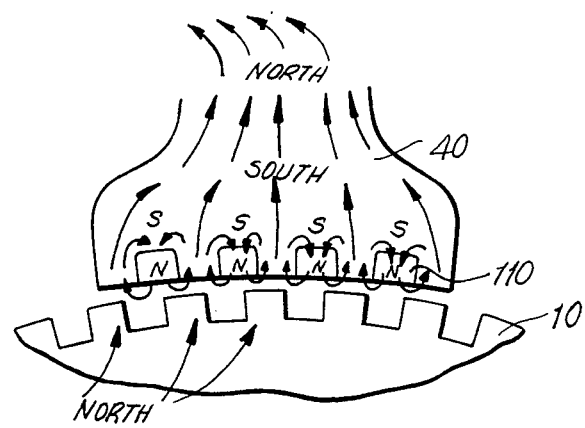
FIG. 7

| WINDINGS | 82 & 90 | 84 & 92 | 86 & 94 | 88 & 96 |
| POLES | 40 & 48 | 42 & 50 | 44 & 52 | 46 & 54 |
| PHASE | A | B | C | D |
| STEPS | | | | |
| --- | --- | --- | --- | --- |
| 1 | 1 | -1 | 0 | 0 |
| 2 | 0 | 1 | -1 | 0 |
| 3 | 0 | 0 | 1 | -1 |
| 4 | -1 | 0 | 0 | 1 |

MAGNETICALLY ENHANCED VARIABLE RELUCTANCE MOTOR SYSTEMS

RELATED APPLICATIONS

This application is related to U.S. application of Ralph W. Horber, Ser. No. 612,563, filed May 21, 1984, and U.S. application of Ralph W. Horber and John G. Gamble, Ser. No. 735,935, filed May 20, 1985. These applications are hereby made a part of this application as if fully recited herein.

BACKGROUND OF THE INVENTION

The invention relates to variable reluctance electric motors and, particularly, to electric motors whose electrically-energized salient stator poles terminate in stator teeth that oppose rotor teeth on the rotor surface, and in which permanent magnets located between adjacent stator teeth and poled transverse to the stator-to-rotor gap enhance the motor torque relative to the applied excitation in ampere-turns.

Such electric motors are disclosed in the aforementioned U.S. applications Ser. No. 612,563 and Ser. No. 735,935. The enhancement disclosed in these applications affords hybrid stepping motors and variable reluctance motors substantial increases, such as 50%, in torque constant. Permanent magnets, of materials such as samarium cobalt are located between the stator teeth of hybrid stepping motors and between both the stator teeth and rotor teeth of variable reluctance motors. These magnets between stator teeth increase the utilization of the rotor's permanent magnet flux for a given ampere-turn excitation of the phase coils surrounding the stator poles. The "inter-teeth" magnets achieve this result by controlling the motor's working air gap and altering the permeance slope, i.e. the torque making mechanism. The inter-teeth magnets also increase the rate of change of flux through the teeth when the motor rotates, thereby improving the motor's performance as a generator.

However, using these techniques on past variable reluctance motors has required placing such magnets between the teeth on the periphery of the rotor. This increases the rotor's inertia. Also, it makes the motor difficult to manufacture and increases its weight and cost.

SUMMARY OF THE INVENTION

An object of the invention is to improve variable reluctance motors.

Another object is to avoid the aforementioned disadvantages.

Yet another object of the invention is to enhance the performance of variable reluctance motors while minimizing the inertia of the rotor.

Another object is to enhance the performance in a cost-effective manner.

According to a feature of the invention, such objects are attained, in whole or in part, by maintaining the polarity alignment of the inter-teeth permanent magnets transverse to the direction of rotor travel but reversing the polarity from pole to pole.

According to another feature of the invention, the inter-teeth magnets are placed only between stator teeth.

According to yet another feature, a driver drives the phase coils on the stator poles by energizing the coils on only half of the stator poles at one time.

According to yet another feature, the driver energizes the coils unidirectionally.

According to yet another feature, the coils of adjacent stator poles are wound in opposite directions.

According to yet another feature, the driver drives oppositely wound coils on adjacent poles simultaneously during each step while leaving the next two poles unenergized.

According to yet another feature, the driver energizes four phases in the step sequence 1 1 0 0 for the first step, 0 1 1 0 for the second step, 0 0 1 1 the third, 1 0 0 1 the fourth step, etc., where "1" represents energization and "0" non-energization.

These and other features of the invention are pointed out in the claims. Other objects and advantages of the invention will become evident from the following detailed description of preferred embodiments of the invention when read in light of the accompanying drawings.

BRIEF DESCRIPTION OF THE DRAWINGS

In the drawings:

FIG. 5 is a phase sequence truth table by which the driver of FIG. 1 energizes the windings of FIGS. 2 to 4.

FIG. 6 is a detail diagram showing the flux paths induced between energized field poles in the motor of FIGS. 2 to 5.

FIG. 7 is a detail diagram showing the interaction of flux paths induced in one energized field pole and the flux paths produced by the magnetic materials in that pole.

DETAILED DESCRIPTION OF PREFERRED EMBODIMENTS

Figure 1:
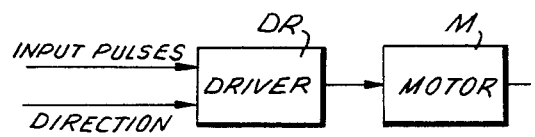
FIG. 1 is a block diagram of a system embodying this invention.

In FIG. 1 a driver DR receives control pulses from an external source (not shown) and drives a motor M. The driver also receives an external rotation direction signal which instructs the driver DR to rotate the motor in one or the other direction.

Figure 2:
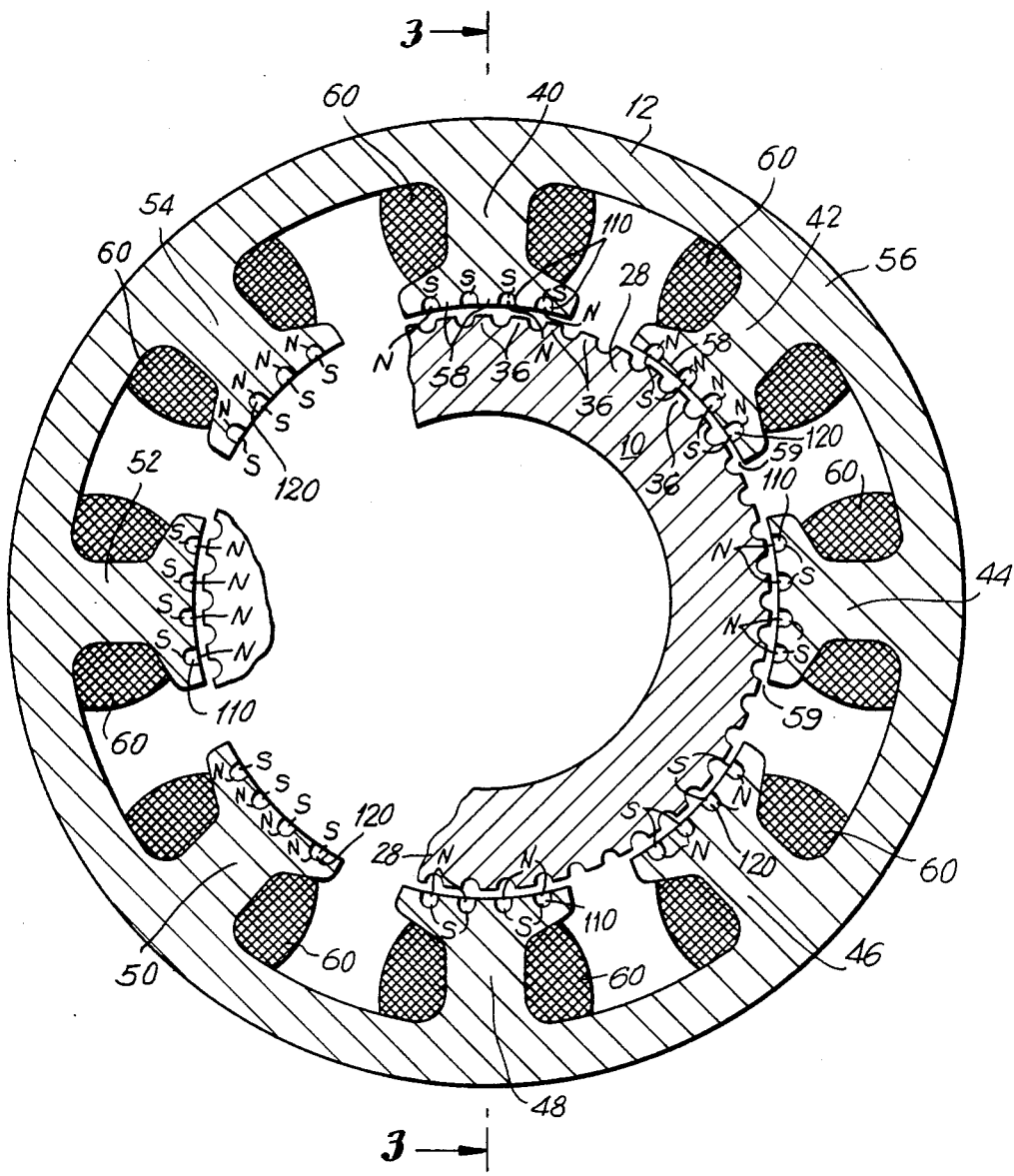
FIG. 2 is a cross-section of the motor in FIG. 1 embodying the invention.
Figure 3:
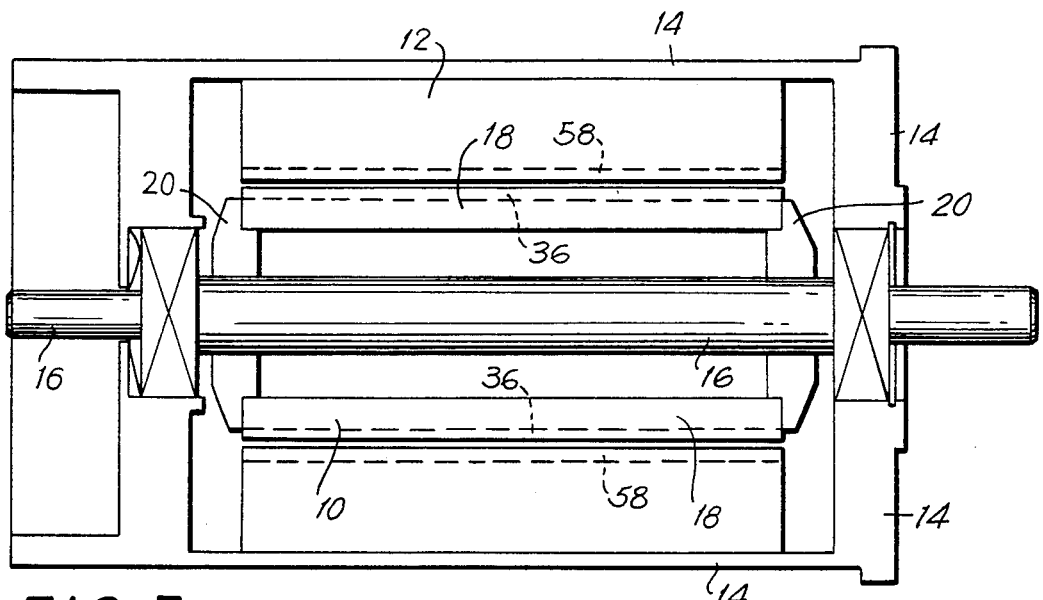
FIG. 3 is a cross-section 3—3 of FIG. 2.

The motor M appears in more detail in FIGS. 2 and 3. In FIGS. 2 and 3, a rotor 10 rotates within a stator 12 mounted within a housing schematically shown as 14. A shaft 16 projects through the housing 14 and is keyed to the rotor 10 for rotation therewith. Suitable bearings B not shown mount the rotor 10 and the shaft 16 to be rotatable within the housing 14.

As specifically shown in FIG. 3, the rotor 10 is composed of annular laminations forming a hollow cylinder 18 secured to the shaft 16 by end caps 20. As more particularly shown in FIG. 2, the rotor 10, about the outer periphery of the hollow cylinder 18, carries fifty peripherally spaced teeth 36 projecting radially outward. Of course, the number of teeth shown is only an example. Other embodiments of the invention utilize rotors with other numbers of teeth such as 40 or 48. In the example shown, the angular or peripheral tooth pitch, that is, the angular distance between like points on adjacent rotor teeth 36 is 7.2 degrees. The teeth 36 are spaced about the entire periphery of the rotor 10. Each tooth extends longitudinally along the axial direction of the rotor from one rotor end to the other.

As shown in FIG. 2, eight angularly displaced poles 40, 42, 44, 46, 48, 50, 52, and 54, project inwardly from a common circumscribing stator portion 56 to form the stator 12. The poles extend longitudinally along the entire axial dimension of the stator 12 beyond the rotor 10. Five stator pole teeth or stator teeth 58 form the inner radial ends of each pole 40 to 54. The pole teeth 58 are formed along an imaginary cylindrical surface coaxial with the rotor 10 and spaced slightly from the rotor teeth 36 and 38 across an air gap 59. In the embodiment shown, the pole teeth are pitched at 7.2 degrees. Thus, here they have the same pitch as the rotor teeth 36 and 38. The poles 40 to 54 and their respective teeth 58 are angularly positioned so that the teeth on two opposite poles such as 40 and 48 can directly oppose the rotor teeth 36 when teeth on poles 44 and 52 ninety degrees therefrom are completely out of alignment with the teeth 36. The teeth 58 on the remaining forty-five degree angularly oriented poles 42, 46, 50, and 54 are angularly arranged so that they are ninety degrees and 270 degrees out of phase with the angular alignment of the rotor teeth 36, in the same rotor position.

Figure 4:
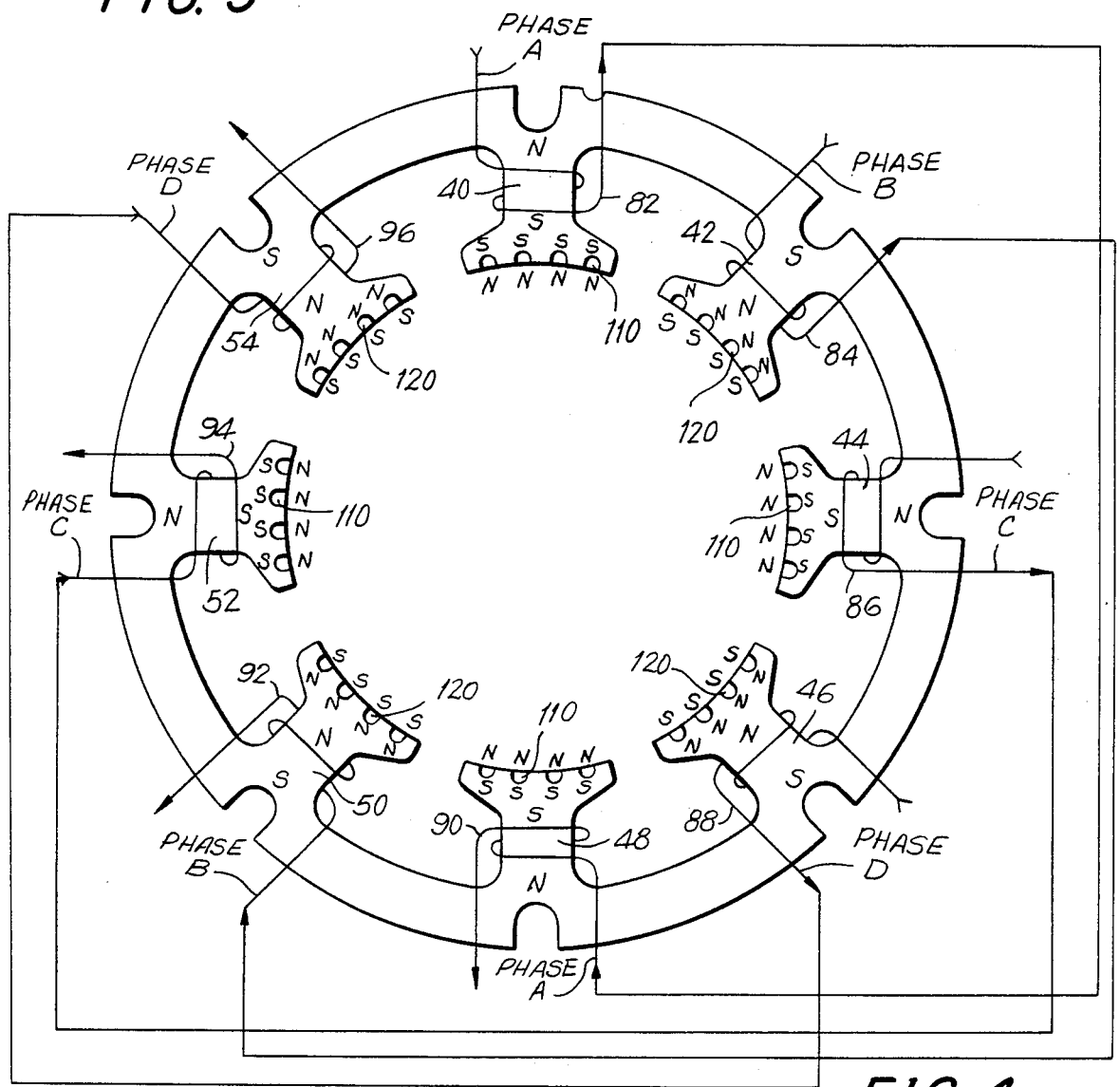
FIG. 4 is a schematic diagram illustrating the stator poles and windings of the motor in FIGS. 2 and 3.

Stator coils 60 magnetize the poles 40 to 54 in a sequence that causes rotation of the rotor 10. Details of the stator coils 60 and their arrangement on the stator appear schematically in FIG. 4. Here the eight coils are formed of eight respective windings 82, 84, 86, 88, 90, 92, 94, and 96. The winding 82 is connected in series with the winding 90, the winding 84 serially connected to winding 92, the winding 86 is in series with the winding 94, and the winding 88 in series with the winding 96. The series windings 82 and 90 are energized by phase A of the driver DR, the series windings 84 and 92 by phase B, the series windings 86 and 94 by phase C, and the series windings 88 and 96 by phase D. Hence, each two windings represent one of four phases A, B, C, and D.

The valleys between the stator teeth are filled with a high magnetic coercivity material 110 and 120 such as samarium cobalt. According to other embodiments of the invention, any magnetic rare earth cobalt or neodymium-boron iron alloys or Ferrites or Alnicos are used. Included among the known magnetic rare earth materials are Nd and Sm. According to an embodiment of the invention, the magnetic materials 110 and 120 constitute shaped magnets.

The magnetic material 110 between the teeth of alternate poles 40, 44, 48, and 52 is radially poled in one direction, and the magnetic material 120 between the teeth of adjacent alternate poles 42, 46, 50 and 54 is radially poled in the opposite direction. That is, the spaces between the stator teeth 58 of adjacent poles have oppositely poled magnetic materials 110 and 120.

FIG. 5 illustrates the phase sequence or energization sequence of the windings or coils 82, 84, 86, 88, 90, 92, 94, and 96. Details of two adjacent poles, winding directions, magnets, and fluxes appear in FIG. 6, with the motor at a stable equilibrium position and with one pole of each phase on.

As shown in FIGS. 4, 5, 6, and 7, the driver DR generates unidirectional current pulses and the winding directions of windings 82 to 96 are set always to aid the transformer coupling effect from pole to pole. The direction in which the magnetic materials 110 and 120 are poled always opposes the magnetic polarity which the windings 82 to 96 induce in the poles 40 to 54 in which they are mounted. Conversely, the windings 82 to 96 are wound to induce polarities which oppose the polarities of the magnetic materials 110 and 120. That is when the windings 82, 86, 90, or 94 induce magnetic fields in the poles 40, 44, 48, or 52, the polarities of the poles are North and South radially inward. On the other hand the magnetic materials 110 in these poles exhibit polarities South to North radially inward. When the windings 84, 88, 92, or 96 energize poles 42, 46, 50, or 54, the resulting polarities of the poles are South to North radially inward. The polarities of the magnetic materials 120 oppose these polarities by being North to South radially inward. The magnetic materials 110 and 120 interact with the flux induced in the poles by redirecting the leakage flux into the teeth.

According to the embodiment shown, to induce the polarities which cause the stator poles 40 to 45 to advance the rotor 10 in the desired manner, the driving sequence or phase sequence of the driver DR is such as to energize only four of the eight poles at any time. That is, at any time, two adjacent poles such as 40 and 42 are energized to be magnetized in opposite directions, the next two such as 44 and 46 are un-energized, the next two such as 48 and 50 energized for magnetization in opposite directions, and the last two such as 52 and 54 are unenergized. In the next step, the driver DR de-energizes the first of each two previously-energized poles such as 40 to 48 and energizes the first of each two previously unenergized poles such as 44 and 52. In succeeding steps, that pattern is repeated as shown in FIG. 5.

In operation, the driver DR applies voltage pulses to the windings 82 to 96 in four phases A to D during any one step and continues in sequential steps. That is, the driver produces four parallel simultaneous excitations each of which is on or off, i. e. "0" or "1". Specifically, the driver DR pulses windings 82 and 90 (phase A), windings 84 and 92 (phase B), 86 and 94 (phase C), and windings 88 and 96 (phase D), i.e. the phases A, B, C, and D, according to the pattern 1 1 0 0 during the first step, 0 1 1 0 during the second step, 0 0 1 1 during the third step, 1 0 0 1 during the fourth step, 1 1 0 0 during the fifth step, 0 1 1 0 during the sixth step, 0 0 1 1 during the seventh step, 1 0 0 1 during the eighth step, etc. In this characterization, "1" indicates a pulse through the respective winding and magnetization of the corresponding pole, while a "0" indicates no pulse and no magnetization during that particular step. Stepping the variable reluctance motor turns the rotor 10 because each step of field winding excitation constrains the rotor to seek a position that forms a magnetic path of least reluctance through the air gap 59 and rotor teeth 36 and stator teeth 58. Each change in working air gap permeance provided by the rotor teeth 36 and stator teeth 58 produces torque.

If a step lasts long enough, the rotor reaches the stable equilibrium position it seeks during the step. Such a position is shown in FIG. 6. There the flux path from teeth on stator pole 40 (phase A) draws the rotor teeth 36 counterclockwise to the left and the flux path in stator pole 54 draws the rotor teeth 36 to the right or clockwise. Although not shown in FIG. 6, pole 48 helps pole 40 draw the rotor counterclockwise and pole 46 aids pole 54 in the clockwise pull. The succeeding step de-energizes pole 54 (and pole 46) and energizes adjacent pole 42 (and pole 50) which helps pole 40 (and pole 48) draw the rotor teeth 36 counterclockwise to the left toward another equilibrium position where the pole 40 is de-energized. The pole 44 (and pole 52) helps pole 42 and pole 50 draw the rotor counterclockwise another step. The process continues as long as the driver DR steps the motor M.

The motor system, according to the invention, furnishes a substantial improvement in variable reluctance motors by furnishing significantly higher torques for the same number of ampere-turns compared to prior motors, or by furnishing the same torque with fewer ampere-turns than previous variable reluctance motors. The motor system also provides improved torque when compared to comparably sized and energized magnetically enhanced hybrid motors.

The invention may also be practiced by turning the windings 82 to 96 in the same direction and having the driver DR drive the windings 84, 88, 92, and 96 in directions opposite to the windings 82, 86, 90, and 94.

Figure 8:
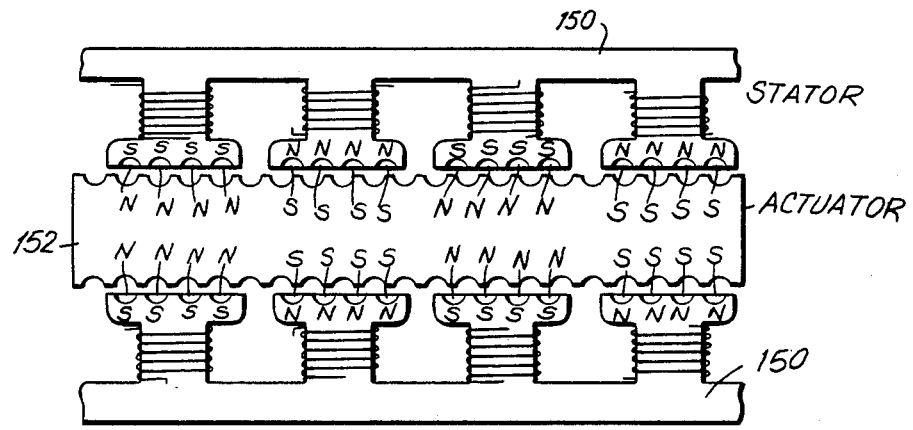
FIG. 8 is a diagram of a linear motor embodying the invention.

Another embodiment of the invention is shown in FIG. 8. Here the invention is practiced with a linear motor where a stator 150 is actuated in the same manner as in the rotating motor M to drive an actuator 152.

Figure 9:
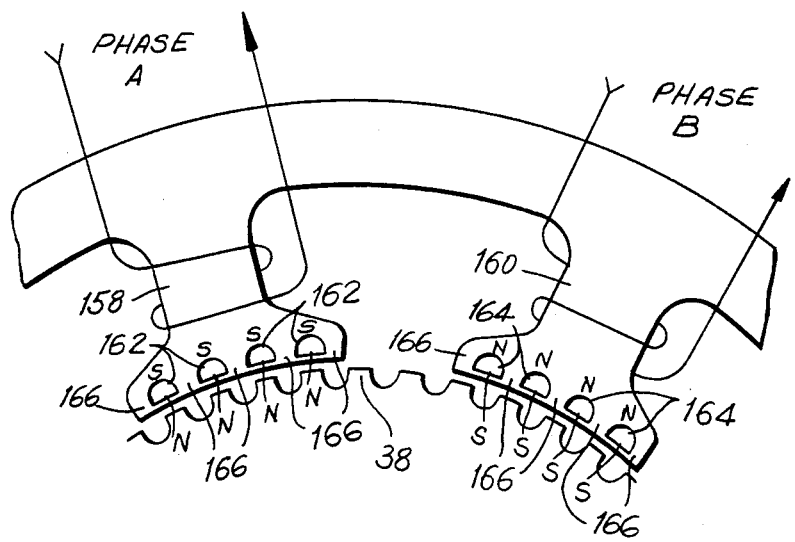
FIG. 9 is a schematic representation of another embodiment of the invention showing a detail of the motor in FIG. 1 wherein the stator poles are constructed in a different form.

Another embodiment of the invention is shown in FIG. 9 where the permanent magnets 162 and 164 are embedded in poles 158 and 160 to form teeth 166 between them. Successive poles have magnets 162 and 164 alternately embedded therein so each pole corresponds either to pole 158 or 160.

The rotor 10 of the rotating motor in FIGS. 2 to 7 and the actuator 152 in FIG. 8 both constitute a mover that moves relative to the stator.

Figures 10, 11:
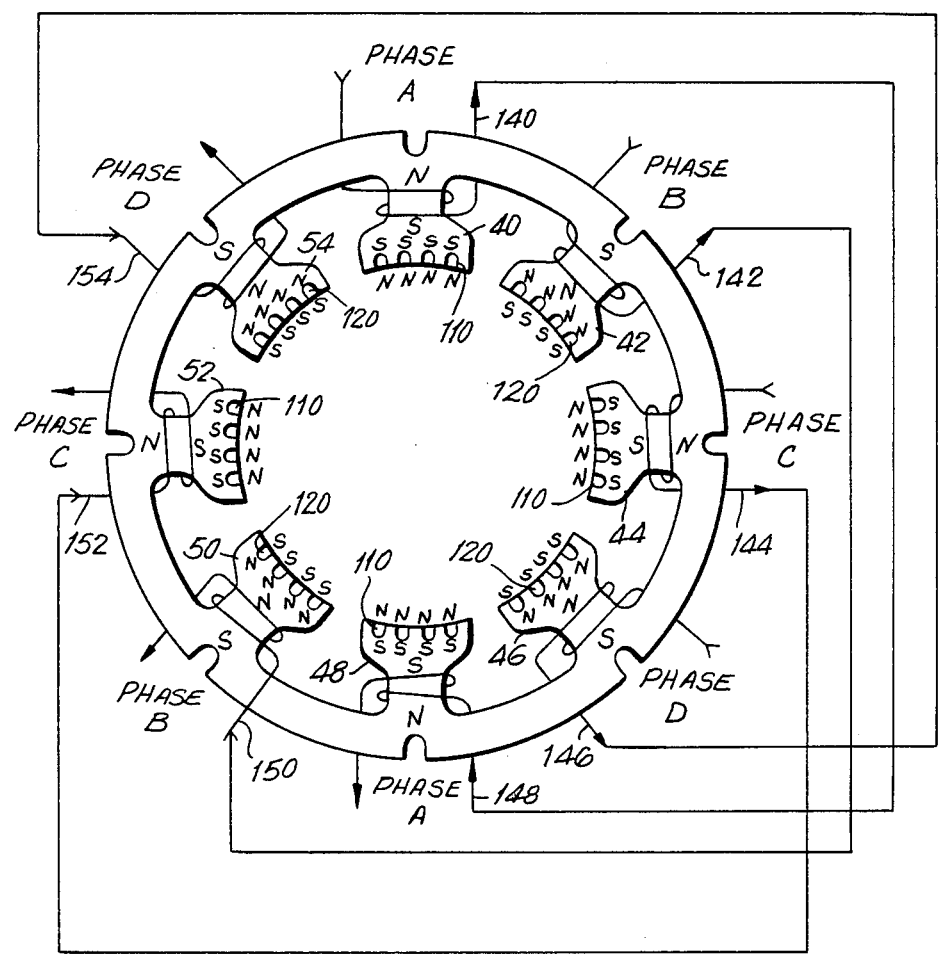
FIG. 10 is a schematic diagram illustrating the stator pole windings and magnetic materials of another embodiment of the motor in FIG. 1.
FIG. 11 is a truth table for the motor in FIG. 10.

Another embodiment of the invention is shown in FIGS. 10 and 11. Here the poles 40 to 54 carry windings 140 to 154 all wound in the same direction and connected in series to form four phases as shown. The driver DR excites the windings on a bipolar basis. That is the driver passes current in one or the other direction, indicated by "1" or "−1", in each phase and also turns the windings off as indicated by "0". The phases and steps used appear in FIG. 11. As can be seen adjacent energized phases are excited in opposite directions to achieve opposite polarities which oppose the polarities of the magnetic materials 110 and 120.

The motor according to the invention furnishes the ability to increase torque for corresponding excitation in ampere turns not only with respect to corresponding variable reluctance motors, magnetically enhanced variable reluctance motors, and hybrid motors, but also enhanced hybrid motors.

While embodiments of the invention have been described in detail, it will be evident that the invention may be embodied otherwise without departing from its spirit and scope.

What is claimed is:

1. a stepping motor, comprising:
   a stator;
   a plurality of stator poles on said stator;
   a winding on each of said stator poles;
   a plurality spaced stator teeth on said stator poles, each of said stator poles having at least one tooth;
   a mover movable relative to said stator;
   said mover having a plurality of spaced mover teeth located for movement along a first direction past said stator pole teeth;
   a plurality of sections of permanent magnetic material on said stator poles, each of said sections being located adjacent a stator tooth and poled in a direction transverse to the first direction;
   each pole having at least one of said sections, the sections on each of said stator poles being poled transverse to the first direction but opposite to the direction of the poling of the sections on an adjacent stator pole.

2. A motor as in claim 1, wherein each of said stator poles includes a plurality of teeth and a section between adjacent teeth.

3. A motor as in claim 1, wherein said mover is a rotor.

4. A motor as in claim 3, wherein each of said stator poles include a plurality of teeth and a section between adjacent teeth.

5. A motor as in claim 1, wherein said material is samarium cobalt.

6. A motor as in claim 1 wherein said material is a neodymium-boron alloy.

7. A motor as in claim 4, wherein said material is samarium cobalt.

8. A motor as in claim 4, wherein said material is a neodymium-boron alloy.

9. A motor as in claim 1, wherein said sections are permanent magnet inserts.

10. A motor as in claim 1, wherein the windings on adjacent stator poles are wound in opposite directions so as to make the polarity of each stator pole opposite to the polarity of the adjacent stator pole when each of said windings are excited by current in the same direction and to oppose the polarity of said sections.

11. A motor as in claim 10, wherein each of said stator poles includes a plurality of teeth and sections between adjacent teeth.

12. A motor as in claim 10, wherein said mover is a rotor.

13. A motor as in claim 12, wherein each of said stator poles includes a plurality of teeth and sections between adjacent teeth.

14. A motor as in claim 10, wherein said material is samarium cobalt.

15. A motor as in claim 10, wherein said material is neodymium-boron alloy.

16. A motor as in claim 10, wherein said sections are permanent magnet inserts.

17. A motor as in claim 10, wherein said rotor is a linear actuator.

18. A motor as in claim 11, wherein said rotor is a linear actuator.

19. A motor as in claim 16, wherein said rotor is a linear actuator.

20. A motor as in claim 1, wherein said stator poles have surfaces facing the rotor and said stator teeth are formed by locating the sections beneath the surfaces and spacing the sections so as to form teeth between them.

21. A stepping motor system, comprising:
   driving means for producing pulsed voltages;
   a motor coupled to said driving means; and including:
   a stator;

a plurality of stator poles on said stator;
a winding on each of said stator poles;
a plurality spaced stator teeth on said stator poles, each of said stator poles having at least one tooth;
a mover movable relative to said stator;
said mover having a plurality of spaced mover teeth located for movement along a first direction past said stator pole teeth;
a plurality of sections of permanent magnetic material on each of said stator poles, each of said sections being located adjacent a stator tooth and poled in a direction transverse to the first direction;
each pole having at least one of said sections, the sections on each of said stator poles being poled transverse to the first direction but opposite to the direction of the poling of the sections on an adjacent stator pole.

22. A system as in claim 21, wherein said driver means is arranged to generate four phases of coded pulses to make the winding on the stator poles produce polarities in the same direction as each of said sections on each of said stator poles.

23. A system as in claim 21, wherein the windings on adjacent stator poles are wound in opposite directions so as to make the polarity of each stator pole opposite to the polarity of the adjacent stator pole when each of said windings are excited by current in the same direction and to oppose the polarity of said sections.

24. A system as in claim 23, wherein said driver means is arranged to generate the pulses unidirectionally.

25. A system as in claim 23, wherein said driver means is arranged to generate the pulses unidirectionally in four phases A, B, C, and D in steps such that for the respective phases A, B, C, and D, the pulses are 1 1 0 0 for a first step, 0 1 1 0 for a second step, 0 0 1 1 for a third step, and 1 0 0 1 for a fourth step.

26. A system as in claim 21, wherein said motor is a rotational motor.

27. A system as in claim 21, wherein said motor is a linear motor.

28. A system as in claim 21, wherein said driver means is arranged to generate a plurality of steps with four phases per step, said phases being 1 1 0 0 for the first step and 0 1 1 0, 0 0 1 1, and 1 0 0 1 for succeeding steps, where "0" is a current-off condition and "1" is a current-on condition.

29. A system as in claim 21, wherein the windings on adjacent stator poles are wound in the same direction so as to make the polarity of each stator pole opposite to the polarity of the adjacent stator pole when each of said windings are excited by current in opposite directions and to oppose the polarity of said sections.

30. A system as in claim 1, wherein the windings on adjacent stator poles are wound in the same direction so as to make the polarity of each stator pole opposite to the polarity of the adjacent stator pole when each of said windings are excited by current in opposite directions and to oppose the polarity of said sections.

31. A motor as in claim 1, wherein, the first direction is along a surface separating said mover and said stator and the sections on the stator poles are poled transverse to the surface.

32. A system as in claim 21, wherein, the first direction is along a surface separating said mover and said stator and the sections on the stator poles are poled transverse to the surface.

* * * * *